(12) United States Patent
Skala et al.

(10) Patent No.: US 8,609,298 B2
(45) Date of Patent: Dec. 17, 2013

(54) FORM AND FILL SUBGASKET

(75) Inventors: Glenn W. Skala, Churchville, NY (US); Vinod Kumar, Pittsford, NY (US)

(73) Assignee: GM Global Technologies Operations LLC, Detroit, MI (US)

( * ) Notice: Subject to any disclaimer, the term of this patent is extended or adjusted under 35 U.S.C. 154(b) by 108 days.

(21) Appl. No.: 13/210,668

(22) Filed: Aug. 16, 2011

(65) Prior Publication Data

US 2013/0045434 A1    Feb. 21, 2013

(51) Int. Cl.
*H01M 2/14* (2006.01)

(52) U.S. Cl.
USPC .......................................................... 429/508

(58) Field of Classification Search
None
See application file for complete search history.

(56) References Cited

U.S. PATENT DOCUMENTS

| | | | |
|---|---|---|---|
| 6,649,097 B2 * | 11/2003 | Sasaki et al. | 264/102 |
| 7,138,202 B2 | 11/2006 | Frank et al. | |
| 7,892,692 B2 | 2/2011 | Beutel | |
| 2010/0159294 A1 | 6/2010 | Fly et al. | |
| 2011/0195332 A1 * | 8/2011 | Goebel | 429/465 |

\* cited by examiner

*Primary Examiner* — Patrick Ryan
*Assistant Examiner* — Wyatt McConnell
(74) *Attorney, Agent, or Firm* — Fraser Clemens Martin & Miller LLC; J. Douglas Miller

(57) ABSTRACT

A method for manufacturing a subgasket for a fuel cell stack having a pair of plates disposed in a stack includes the step of positioning a membrane between the plates. The membrane includes an inboard portion and a tortuous form portion. The inboard portion abuts a proton exchange membrane of the fuel cell, and the tortuous form portion abuts each of the plates. The tortuous form portion defines at least one cavity between one of the plates and the membrane. A viscous sealant is injected into the cavity. The sealant is cured to form a compliant bead seal on the membrane.

20 Claims, 6 Drawing Sheets

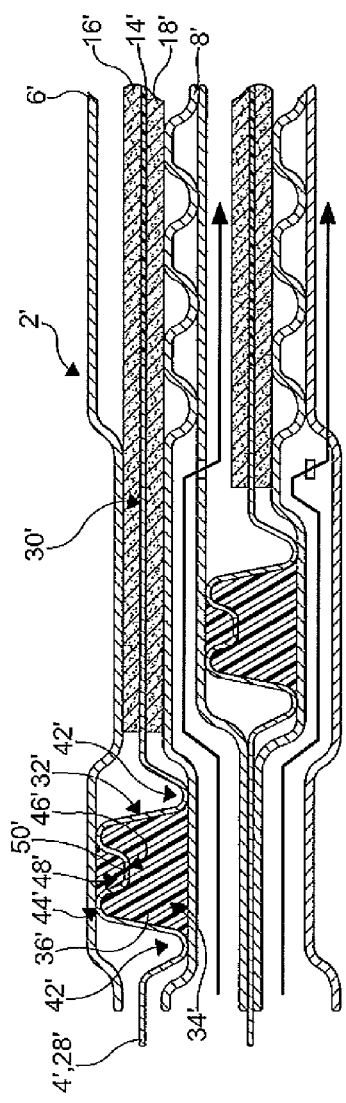
FIG. 9
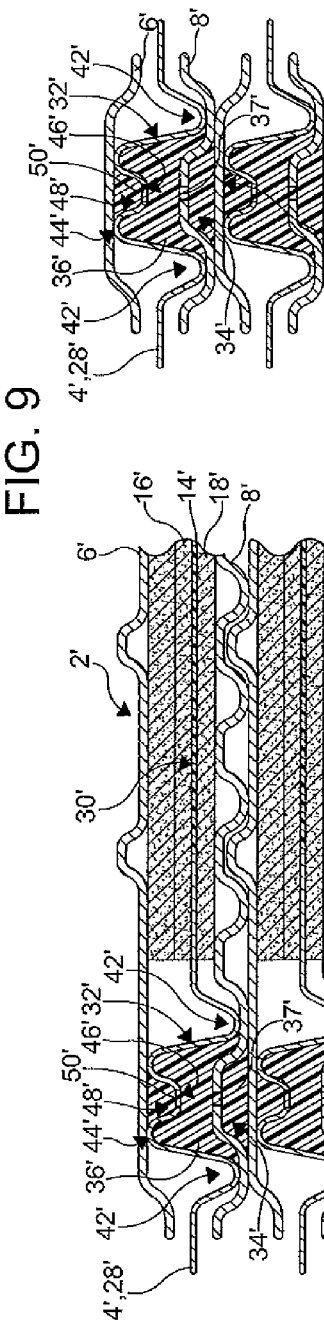
FIG. 10
FIG. 11
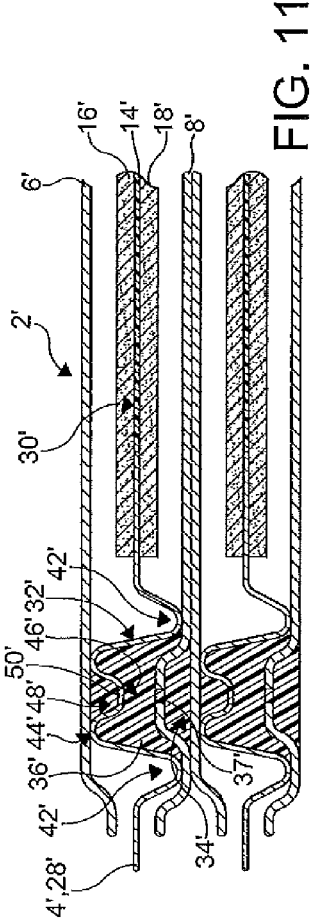
FIG. 12

FORM AND FILL SUBGASKET

FIELD OF THE INVENTION

This invention relates to a fuel cell stack and, more particularly, to a system and method for manufacturing a subgasket of the fuel cell stack.

BACKGROUND OF THE INVENTION

A fuel cell has been proposed as a clean, efficient and environmentally responsible power source for various applications. In particular, individual fuel cells can be stacked together in series to form a fuel cell stack capable of supplying a quantity of electricity sufficient to power an electric vehicle. The fuel cell stack has been identified as a potential alternative for a traditional internal-combustion engine used in modern vehicles.

Fuel cells are electrochemical devices which combine a fuel such as hydrogen and an oxidant such as oxygen to produce electricity. The oxygen is typically supplied by an air stream. The hydrogen and oxygen combine to result in the formation of water. Other fuels can be used such as natural gas, methanol, gasoline, and coal-derived synthetic fuels, for example.

One type of fuel cell is known as a proton exchange membrane (PEM) fuel cell. The PEM fuel cell typically includes three basic components: a cathode, an anode, and an electrolyte membrane. The cathode and anode typically include a finely divided catalyst, such as platinum, supported on carbon particles and mixed with an ionomer. The electrolyte membrane is sandwiched between the cathode and the anode to form a membrane-electrolyte-assembly (MEA).

In a typical PEM-type fuel cell, the MEA is sandwiched between diffusion media or diffusion layers (DM) that are formed from a resilient, conductive, and gas permeable material such as carbon fabric or paper. In certain designs, the cathode and anode are also formed on the DM and sandwich the electrolyte membrane. The DM serve as current collectors for the anode and cathode as well as provide mechanical support for the MEA. The DM and MEA are pressed between a pair of electronically conductive bipolar plates which also serve as current collectors for collecting the current from the electrochemical fuel cell reaction.

The bipolar plate typically includes two thin, facing metal unipolar plates. One of the metal unipolar plates defines a flow path on one outer surface thereof for delivery of hydrogen reactant to the anode of the MEA. An outer surface of the other unipolar plate defines a flow path for the oxidant reactant for delivery to the cathode side of the MEA. When the unipolar plates are joined, the joined surfaces define a path for a coolant fluid to flow therethrough. The unipolar plates are typically produced from a formable metal that provides suitable strength, electrical conductivity, and corrosion resistance, such as 316L alloy stainless steel, for example.

The fuel cell stack is generally compressed to hold the various components thereof together in operation. To militate against undesirable leakage of reactants and other fluids from the fuel cell stack, a seal is often employed. The seal may be provided by a subgasket, for example, connected to the electrolyte membrane. The seal may also be disposed along a peripheral edge of the pairs of plates. Known seals have been formed from an elastomeric material.

There is a continuing need for a method of sealing between plates of a fuel cell stack, wherein the seal militates against a leakage of fluids from the fuel cell stack and a manufacturing complexity is minimized.

SUMMARY OF THE INVENTION

In concordance with the instant disclosure, a method of sealing between plates of a fuel cell stack, wherein the seal militates against a leakage of fluids from the fuel cell stack and a manufacturing complexity is minimized, has surprisingly been discovered.

Formed SubGasket

Formed Subgasket Material Candidates:

The subgasket may be fabricated from thin film polymers that are low in cost while being compatible with the fuel cell environment and the processing steps necessary to fabricate the subgasket, as well assemble the subgasket into a fuel cell. Some film materials are higher temperature variants of polypropylene, PEN, and PET. One of ordinary skill should understand that a foamed version of the polymer film may be desirable where the thickness of the subgasket varies across a footprint of the subgasket. In particular, foamed polymer allows thickness variations without requiring excessive flow of the polymer in the plane of the film during the fabrication process.

Fabrication Process Options:

One approach to fabrication is to thermoform thin polymer films. A thermoform process known as match molding may particularly be used, and enables precise details to be formed in the film. Additionally, match molding can flow some of the polymer in the plane of the part, producing both thick and thin sections. Match molding is accomplished by heating the film to just below or above a melt point, and squeezing the film between a positive and negative mold of the part.

If a somewhat uniform thickness of the resulting part is required and precision of the features is not required, then vacuum forming and/or pressure forming may also be employed. As the formed subgasket does not require significant stretch (i.e., the subgasket is substantially planar) this method may be employed.

Seal Bead Form:

The seal bead form is designed such that the seal bead form can flex during stack compression, but not to the point where stresses reduce an ability of the seal bead form to retain fluid pressure during injection of an uncured elastomeric sealant. When partially compressed, for example, prior to injecting the uncured elastomeric sealant, the seal bead form needs to exert sufficient force at the lines of contact to the bipolar plates in order to seal sufficiently and prevent significant leakage of the injected, uncured elastomeric sealant. Any insignificant leakage of the sealant should not compromise the post-cure compression of the bead or block flow of reactants or coolant in the fuel cell stack.

The seal bead form may only contact one bipolar plate utilizing a single hump bead profile. This embodiment may require a thin seal (or adhesive) between the top of the formed bead profile and the lower surface of the upper bipolar plate. A second embodiment uses a two-hump bead profile with perforations along the formed elastomer passage and located between the two humps in the bead profile. When filled, uncured elastomer flows through the perforations providing elastomer contact to both bipolar plates.

The elastomer passages connect at one or more points across the footprint of the cell. These connection points also allow flow from cell to cell through substantially coincident passages or holes.

Shorting Protection:

Shorting protection (e.g., outside an active area) may be provided by forming thicker regions on the subgasket to mostly fill the space between the bipolar plates outside the seal bead forms. The thicker regions may be achieved by using thicker film to start with, or forming patterns in the film in particular embodiments.

Locating Features:

Features that locate the subgasket assembly to at least one of the bipolar plates may be formed at the same time as the seal bead form features. This assures that the seal features are accurately aligned with the stamped features on the bipolar plates. One embodiment would be to utilize the inlet and/or outlet ports for uncured elastomer sealant injection, as these could also be used to align cell to cell during stacking.

Sealant Material Candidates:

It has been determined that a relatively low viscosity (e.g., 1000 to 2000 cP) uncured elastomeric sealant may be used in order to keep fill times reasonably short (e.g., about 30 sec) and injection pressures that can be handled by the elastomer passages in the formed subgasket device. The cure technologies may be two-part, thermal, or a combination of the two. Other cure technologies may also be used.

Another suitable material for the sealant may be a foaming elastomeric fluid, as long as the compression set of the foam within the formed subgasket passages remains low over the life of the fuel cell.

Fuel Cell Stack Assembly

Stacking:

The formed subgasket is positioned between each bipolar plate. The subgasket may have the fuel cell membrane electrode assembly (MEA) already attached.

At lower volumes, smaller groups of cells (e.g., 10-30) could be stacked and sealed. These groups of cells can employ serviceable seals between the cell groups. This allows quality control to build and test these sub-stacks as well as service them as the technology matures. As times goes by, quality, reliability and volumes increase, the size of the groups of cells can increase and eventually the entire stack is stacked and sealed as one unit. This arises from a reduced need for service and reducing the number of seals and assembly steps.

When substacks are used, a dedicated tooling may be employed for compression. This tooling emulates the compression that is typically provided by the end units of the fully assembled fuel cell stack. If a post cure leak checking and/or performance testing is desired, this tooling fully emulates the end units found on a full sized stacks. This would entail compression, fluid flow (hydrogen, humidified air, and possibly coolant) sealing as well as electrical connections (cell power) and electrical isolation.

When a full sized fuel cell stack is being sealed at once, the production stack end units intended for the completed fuel cell stack may be used in lieu of dedicated tooling. In this case, there are provisions for injecting the elastomer through the end units into the stack of cells.

Adhesion to Plate:

While it is preferred to use cell compression to seal the unfilled elastomer passages in the subgasket, it may be necessary to adhere the regions next to the elastomer passages at the base of the bead profile to one side of each bipolar plate. This can be done with various fuel cell compatible pressure sensitive adhesives or a hot melt adhesive that is activated though contact with a heated bipolar plate and/or a heat-staking tool.

Partial Compression:

The stack (or substack) is compressed in this step to partially compress the empty elastomer seal passages. This is done primarily to seal the subgasket film to each bipolar plate and contain the pressure of the uncured elastomer during the injection or fill step.

Elastomer Injection:

Once sufficient sealing is assured (e.g., by a vacuum or pressure leak test), the uncured elastomer is then injected with an injection nozzle though one end of the group of cells and one or more injection points. Analysis suggests that a fill pressure of around 60 psi provides an approximately 30 second fill time with a desired seal bead form profile using a fluid with a viscosity of about 1000 cP. Once a complete fill is assured, the injection is stopped and the injection nozzle is removed from the fuel cell stack.

A plug may also be inserted in the inlet ports to contain any uncured elastomer, as desired. The fill may be also facilitated by drawing a vacuum on the elastomer passages prior to and/or during elastomer injection.

Reduce Compression:

In particular embodiments, it is desired to relieve the partial compression on the group of cells in order to allow the seal bead form features to grow in height (e.g., up to their uncompressed height) and allow the elastomer to cure in a taller shape. This would allow more seal compression is a cured state while reducing the stresses on the formed seal bead form.

Seal Cure:

Once a full fill is assured and the flow of elastomer is stopped, the elastomer can cure via multiple paths. Catalytic curing could be done at room temperature or accelerated using heat. The heat may be applied to the bipolar plates prior to and/or during stacking and may soak into the elastomer during and after the fill step.

Full Compression:

Once the seals are sufficiently cured, the stack (or substack) is then fully compressed and installed in its enclosure and passed to the next station for further assembly and/or quality checks.

In one embodiment, a method for manufacturing a subgasket for a fuel cell stack, having a pair of plates disposed in a stack, includes the step of positioning a membrane between the plates. The membrane includes an inboard portion and a tortuous form portion. The tortuous form portion is disposed outboard from the inboard portion. The inboard portion abuts a proton exchange membrane of the fuel cell. In particular embodiment, the inboard portion is substantially planar. The tortuous form portion abuts each of the plates. The tortuous form portion defines at least one cavity between one of the plates and the membrane. A viscous sealant is injected into the cavity. The sealant is cured to form a compliant bead seal on the membrane.

In another embodiment, a subgasket for a fuel cell stack having a pair of plates includes a membrane positioned between the plates. The membrane includes an inboard portion and a tortuous form portion. The inboard portion abuts a proton exchange membrane of the fuel cell. The tortuous form portion abuts each of the plates. The tortuous form portion defines at least one cavity between one of the plates and the membrane. A compliant bead seal is formed on the membrane by injecting a viscous sealant into the cavity and curing the sealant.

In a further embodiment, a fuel cell stack includes a pair of plates disposed in a stack, a pair of diffusion medium layers disposed between the plates, and a membrane electrode assembly sandwiched between the diffusion medium layers. The fuel cell further includes a subgasket having a membrane positioned between the plates. The membrane includes an inboard portion and a tortuous form portion. The inboard portion abuts the membrane electrode assembly of the fuel cell. The tortuous form portion abuts each of the plates. The tortuous form portion defines at least one cavity between one of the plates and the membrane. A compliant bead seal is formed on the membrane by injecting a viscous sealant into the cavity and curing the sealant.

BRIEF DESCRIPTION OF THE DRAWINGS

The above, as well as other advantages of the present invention, will become readily apparent to those skilled in the art from the following detailed description of a preferred embodiment when considered in the light of the accompanying drawings in which:

FIG. 9 is a fragmentary side cross-sectional elevational view of the fuel cell stack according to another embodiment of the disclosure, taken at an anode feed section of the fuel cell stack shown by section line A-A in FIG. 1, shown with the plate present to illustrate assembly with the subgasket;

FIG. 10 is a fragmentary side cross-sectional elevational view of the fuel cell stack according to another embodiment of the disclosure, taken at an edge section of the fuel cell stack shown by section line D-D in FIG. 1, shown with the plate present to illustrate assembly with the subgasket;

FIG. 11 is a fragmentary side cross-sectional elevational view of the fuel cell stack according to another embodiment of the disclosure, taken at a seal joint to an anode tunnel coolant seal of the fuel cell stack shown by section line F-F in FIG. 1, shown with the plate present to illustrate assembly with the subgasket;

FIG. 12 is a fragmentary side cross-sectional elevational view of the fuel cell stack according to another embodiment of the disclosure, taken at a header section of the fuel cell stack shown by section line E-E in FIG. 1, shown with the plate present to illustrate assembly with the subgasket;

DETAILED DESCRIPTION OF THE INVENTION

The following detailed description and appended drawings describe and illustrate various exemplary embodiments of the invention. The description and drawings serve to enable one skilled in the art to make and use the invention, and are not intended to limit the scope of the invention in any manner. In respect of the methods disclosed, the steps presented are exemplary in nature, and thus, the order of the steps is not necessary or critical.

Figure 1:
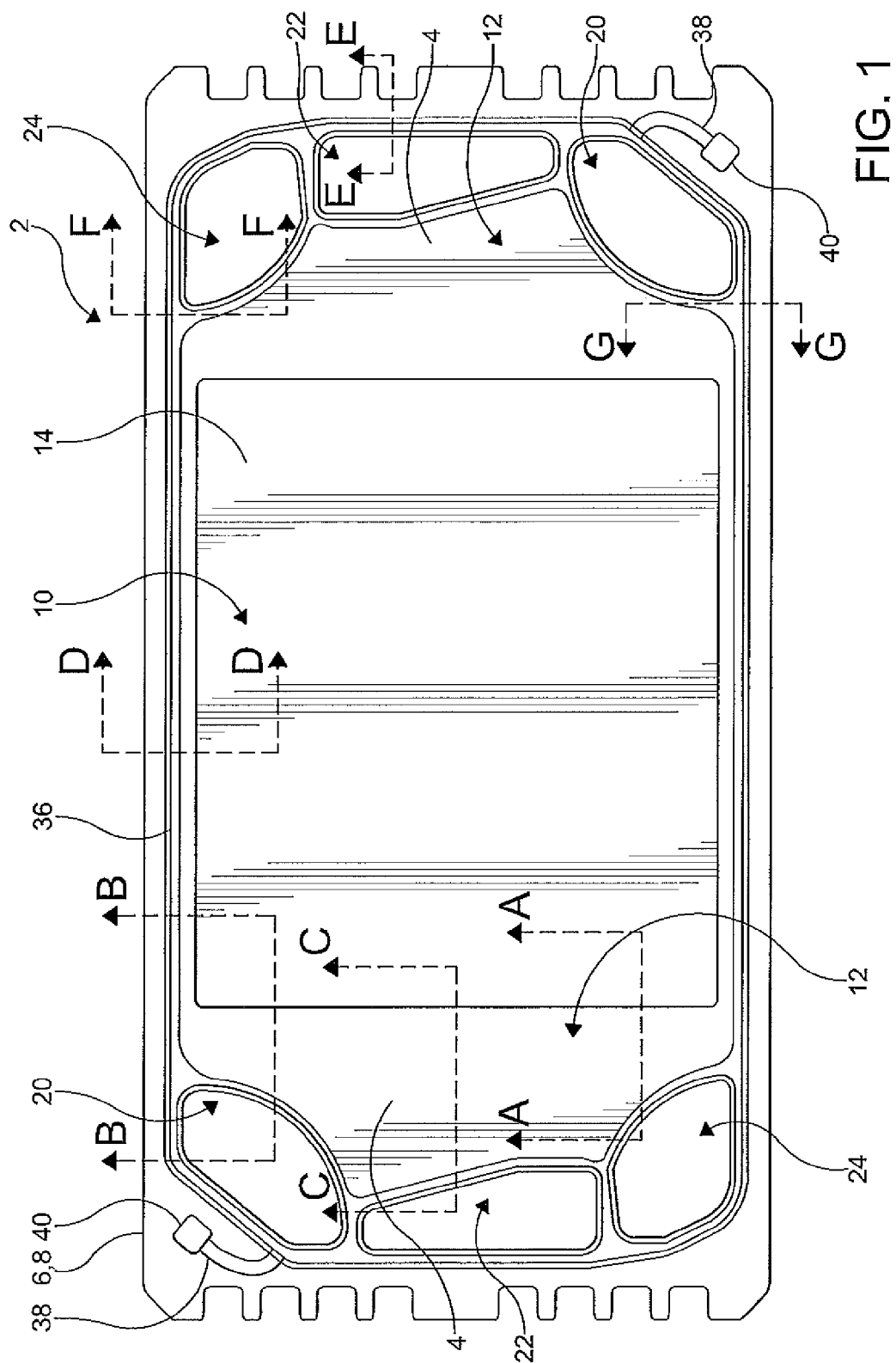
FIG. 1 is a top plan view of an exemplary fuel cell stack according to one embodiment of the disclosure, shown with a plate removed to expose a subgasket of the fuel cell stack.
Figure 2:
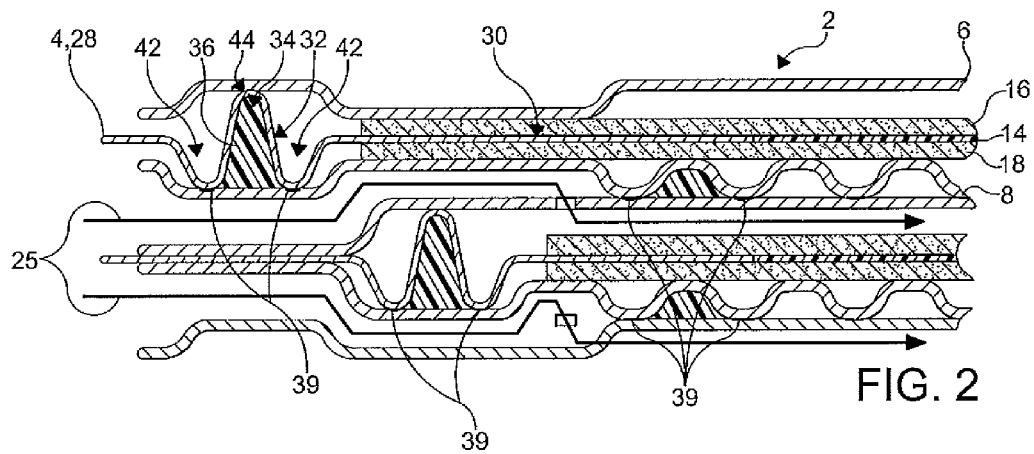
FIG. 2 is a fragmentary side cross-sectional elevational view taken at an anode feed section of the fuel cell stack shown by section line A-A in FIG. 1, shown with the plate present to illustrate assembly with the subgasket.
Figure 3:
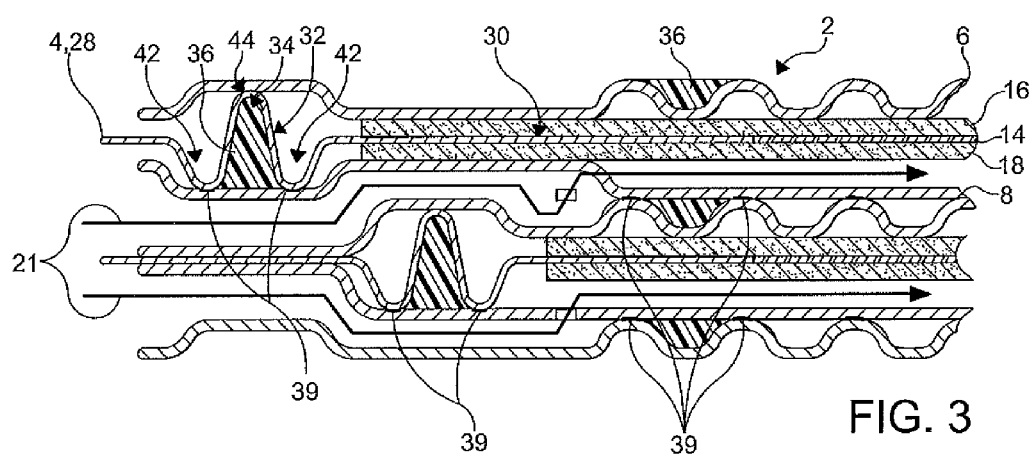
FIG. 3 is a fragmentary side cross-sectional elevational view taken at a cathode feed section of the fuel cell stack shown by section line B-B in FIG. 1, shown with the plate present to illustrate assembly with the subgasket.
Figure 4:
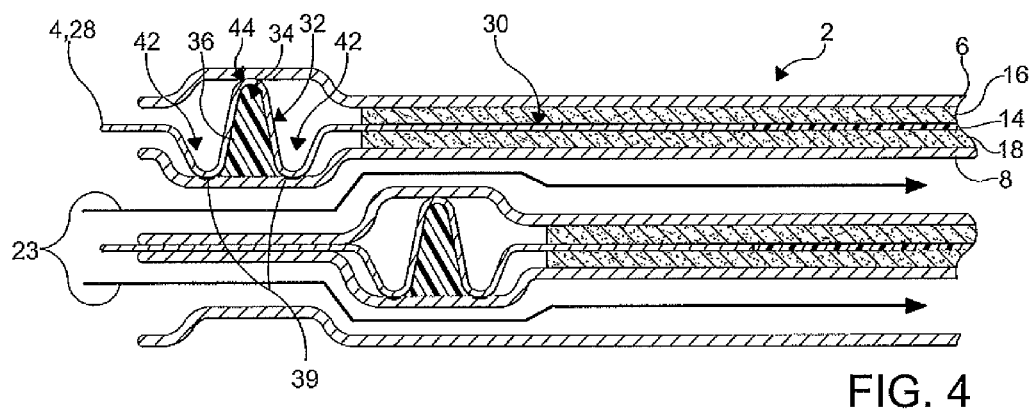
FIG. 4 is a fragmentary side cross-sectional elevational view taken at a coolant feed section of the fuel cell stack shown by section line C-C in FIG. 1, shown with the plate present to illustrate assembly with the subgasket.

FIGS. 1-8 show a fuel cell stack 2 according the present disclosure. In FIG. 1, the fuel cell stack 2 is shown with a subgasket 4 exposed, for the purpose of illustration. Exemplary fuel cell stacks 2 for use with the subgasket 4 of the present disclosure are shown and described in Assignee's copending U.S. patent application Ser. No. 12/341,105 and U.S. Pat. No. 7,892,692, the entire disclosures of which are hereby incorporated herein by reference. Other types of fuel cell stacks 2 may also be employed with the subgasket 4 of the present disclosure, as desired.

The fuel cell stack 2 includes a pair of plates 6, 8 disposed in a stack. For example, the plates 6, 8 may be bipolar plates of the fuel cell stack 2. Each of the plates 6, 8 has an active region 10 and a feed region 12. A membrane electrode assembly or MEA 14 includes a proton exchange membrane sandwiched between a pair of electrode layers and is disposed in the active region 10. The MEA 14 is sandwiched between a pair of diffusion medium layers 16, 18 and the entire assembly is disposed between the plates 6, 8, as shown in FIGS. 2-14. If desired, the MEA 14 may be assembled together with the diffusion medium layers 16, 18 and the subgasket 4 to form a unitized electrode assembly or UEA.

The feed region 12 of the fuel cell stack includes a cathode manifold 20, a coolant manifold 22, an anode manifold 24, and port holes for delivery and exhaust of cathode gases 21, coolant 23, and anode gases 25, respectively. The subgasket 4 is also disposed in the feed region 12. The subgasket 4 includes a membrane 28 positioned between the plates 6, 8. The membrane 28 is formed from a substantially fluid impermeable material having resistance to the internal environmental conditions of the fuel cell stack 2. As nonlimiting examples, the membrane may be formed from one of polypropylene, PEN, and PET. The membrane 28 may also be formed from a polymeric foam. One of ordinary skill in the art may select other suitable materials for the membrane 28, as desired.

The membrane 28 of the subgasket 4 includes an inboard portion 30 and a tortuous form portion 32. The inboard portion 30 abuts the MEA 14 in the active region 10. The tortuous form portion 32 abuts each of the plates 6, 8. The tortuous form portion 32 provides a "form" that defines at least one cavity 34 between one of the plates 6, 8 and the membrane 28. In a particular embodiment shown in FIGS. 2-8, the tortuous form portion 32 includes a pair of major troughs 42 with a peak 44 disposed therebetween. At least one of the major troughs 42 abuts one of the plates 6, 8 and the peak 44 abuts an other of the plates 6, 8.

According to the method of the present disclosure, a compliant bead seal 36 is formed on the membrane 28 of the subgasket 4 by injecting a viscous sealant into the cavity 34 and curing the sealant. The viscous sealant may be a silicone or a urethane sealant, as nonlimiting examples. Where silicone is employed, in particular, siloxanes may provide additional adhesion to the plates 6, 8. Other materials for the sealant may also be used, as desired. The bead seal 36 provides coolant seals between the plates 6, 8 and reactant seals for separating reactant gases flowing to the fuel cell stack 2.

The method for manufacturing the subgasket 4 first includes the step of positioning the membrane 28 between the plates 6, 8, with the tortuous form portion 32 abutting each of the plates 6, 8. The membrane 28 may be affixed when positioned, for example, by at least one heat stake 39 to secure the assembly and contain the subsequently injected sealant. Adhesives may also be used to affix the membrane 28 prior to injection. For example, the peak 44 of the tortuous form portion 32 of the membrane 28 may be affixed to one of the plates 6, 8, with an adhesive in order to form a dry seal between the peak 44 and the one of the plates 6, 8. The subgasket 4 is preferably fabricated prior to the positioning between the plates 6, 8, for example, by a thermoforming process such as match molding. Other methods of fabrication may also be used within the scope of the present disclosure.

Figure 5:
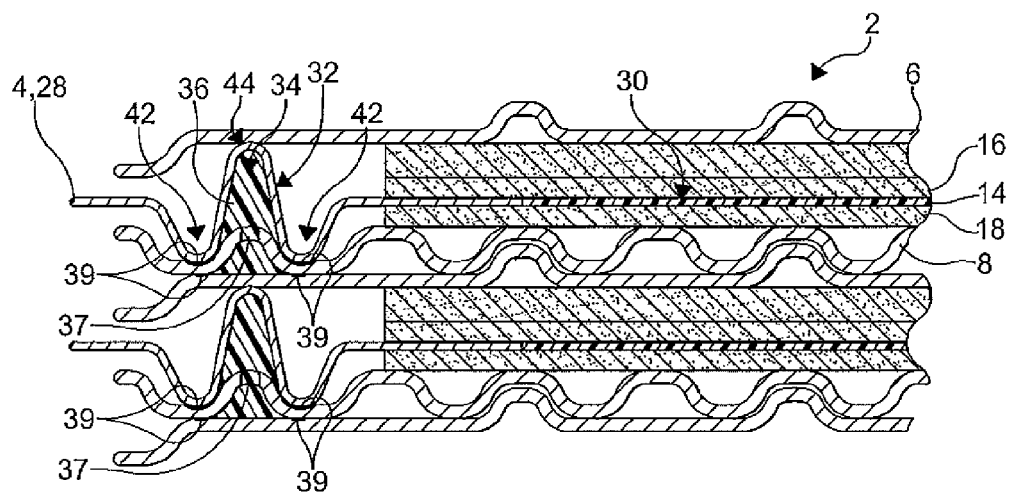
FIG. 5 is a fragmentary side cross-sectional elevational view taken at an edge section of the fuel cell stack shown by section line D-D in FIG. 1, shown with the plate present to illustrate assembly with the subgasket.
Figure 6:
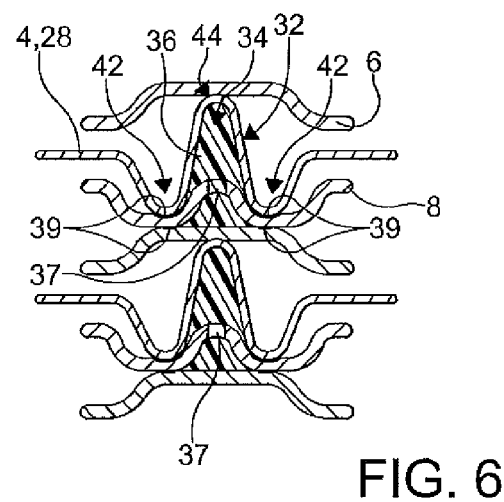
FIG. 6 is a fragmentary side cross-sectional elevational view taken at a header section of the fuel cell stack shown by section line E-E in FIG. 1, shown with the plate present to illustrate assembly with the subgasket.
Figure 7:
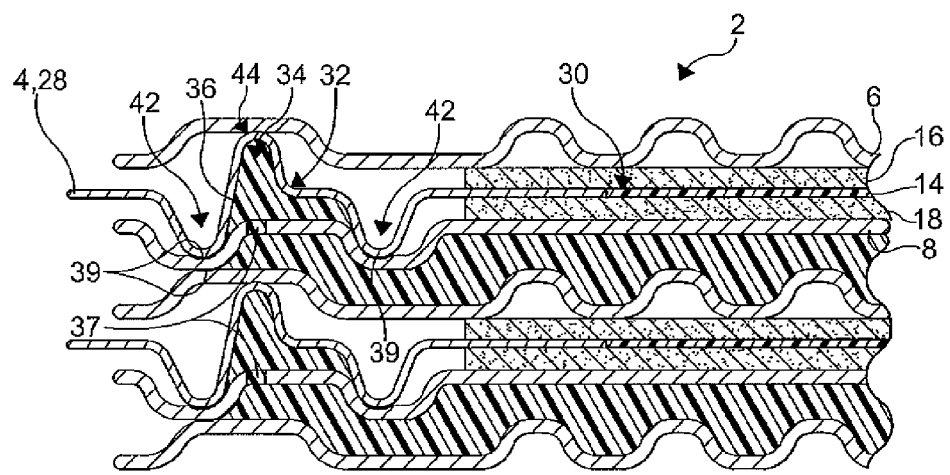
FIG. 7 is a fragmentary side cross-sectional elevational view taken at a seal joint to an anode tunnel coolant seal of the fuel cell stack shown by section line F-F in FIG. 1, shown with the plate present to illustrate assembly with the subgasket.
Figure 8:
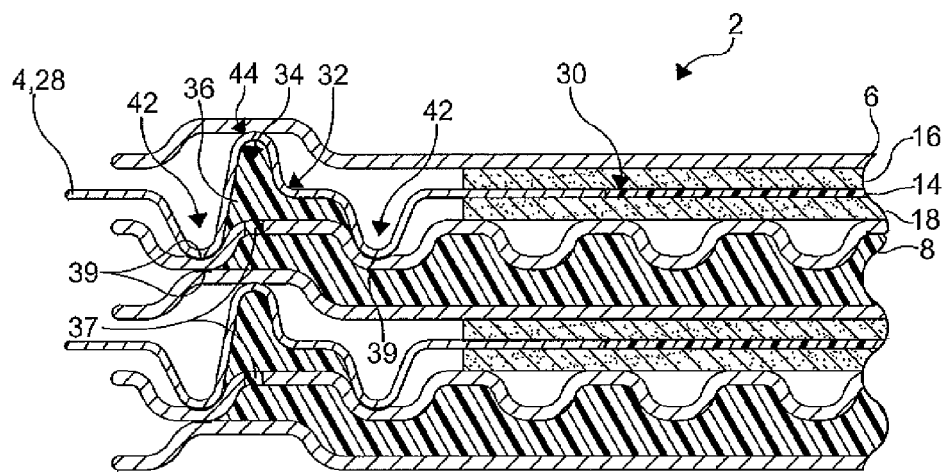
FIG. 8 is a fragmentary side cross-sectional elevational view taken at a seal joint to a cathode tunnel coolant seal of the fuel cell stack shown by section line G-G in FIG. 1, shown with the plate present to illustrate assembly with the subgasket.

Following the positioning of the membrane 28 between the plates 6, 8, the viscous sealant is injected into the cavity 34 defined by the tortuous form portion 32 of the subgasket 4 and the plates 6, 8. The cavity 34 is substantially filled with the sealant during the injection step. The cavity 34 defines a passage through which the sealant flows when injected. As shown in FIG. 5, at least one of the plates 6, 8 may have a hole 37 formed therein adjacent the tortuous form portion 32 of the membrane 28 for the sealant to flow therethrough and also form a seal between the plates 6, 8, for example, at an edge section of the fuel cell stack 2 between the seal bead form and a plate joint. As shown in FIGS. 7 and 8, the hole 37 may also permit a flowing of the sealant into the plate joint in front of tunnels in the fuel cell stack 2.

In certain embodiments, a vacuum may be drawn on the cavity 34 to facilitate the injection of the sealant into the cavity 34. In other embodiments, the sealant is injected under a pressure that forces the sealant throughout the passage defined by the cavity 34. Suitable vacuum and injection pressures may be selected, as desired.

As a nonlimiting example, the injection of the sealant into the cavity 34 may be performed through a sprue 38 that is defined by the plates 6, 8, as shown in FIG. 1. The sprue 38 is in fluid communication with a port 40 formed in each of the plates 6, 8. As a nonlimiting example, the ports 40 through which the sealant is injected into the sprue 38 may be datum holes for aligning the plates 6, 8 in the stack during assembly of the fuel cell stack 2. A skilled artisan may select other ports 40 for the injection of the sealant, as desired.

The sealant is subsequently cured to form the bead seal 36 on the membrane 28. One of ordinary skill in the art should appreciate that the steps for curing the bead seal 36 will be dictated primarily by the sealant selected. For example, the step of curing the sealant is typically performed at one of room temperature and an elevated temperature. Where the sealant is thermally activated, and the step of curing the sealant is performed at the elevated temperature, the plates 6, 8 may be heated prior to the injection of the sealant to cause the elevated temperature and cure the sealant into the bead seal 36. The plates 6, 8, may also be heated after the sealant has been injected. Alternative means for curing the sealant and forming the bead seal 36 such as radiation exposure or the use of two-part curing sealants, as nonlimiting examples, may also be employed within the scope of the present disclosure.

Other materials such as foaming elastomeric fluids may also be employed as the sealant forming the bead seal 36.

Prior to the step of injecting the sealant into the cavity 34, the stack may be at least partially compressed. The partial compression of the stack in this step compresses the cavity 34 forming the passage through which the sealant flows when injected. The partial compression seals the membrane 28 of the subgasket 4 to each of the plates 6, 8 and contains a pressure of the uncured sealant during the injection step. The partial compression is relieved following the step of injecting the sealant into the cavity 34, in order to permit an expansion of the sealant within the cavity 34 and allow the cavity 34 to grow to an uncompressed height. The sealant is likewise permitted to cure into the bead seal 36 having a same height. Following the curing of the sealant to form the bead seal 36, the fuel cell stack 2 may be fully compressed for further assembly into a fuel cell system.

FIGS. 9-12 show the fuel cell stack 2' in accordance with another embodiment of the invention. Similar structure discussed above for FIGS. 1-8 includes the same reference numeral followed by a prime symbol (') for the purpose of clarity.

Referring to FIGS. 9-12, the subgasket 4' may have the membrane 28' with both the inboard portion 30' and the tortuous form portion 32'. The tortuous form portion 32' includes the pair of major troughs 42' with the peak 44' disposed therebetween. The peak 44' includes a minor trough 46' defining another cavity 48'. An aperture 50' is formed in the minor trough 46'. When the sealant is injected into the cavity 34' during the manufacture of the seal bead 36', the sealant also flows through the aperture 50'. Both of the cavities 34', 48' are thereby filled with the sealant.

It should be appreciated that the filling of both of the cavities 34', 48' with the sealant, and the subsequent curing of the sealant, may advantageously provide a superior seal of the subgasket 4' to both of the plates 6', 8'. For example, as shown in FIG. 9, the aperture 50' permits the formation of the seal on both sides of the subgasket 4, and thereby joins the plurality of cells of the fuel cell stack 2. As shown in FIG. 10, a cooperation of the hole 37' and the aperture 50' permits flow between the cavity 34' and the plate joint, resulting in a further sealing of the plates 6', 8'. The hole 37' and the aperture 50' may be substantially the same size and shape, or differently sized and shaped, as desired. As shown in FIG. 11, the cooperation of the hole 37' and the aperture 50' also permits the flow of the sealant to a crevice of the cavity 34' adjacent a welding area, in order to avoid a gap and subsequent leakage during operation of the fuel cell stack 2'. As shown in FIG. 12, at least one of the plates 6, 8 may also have a flat region 53' to allow flexure and transmit seal load to a coolant joint in a header section of the fuel cell stack 2'.

Figure 13:
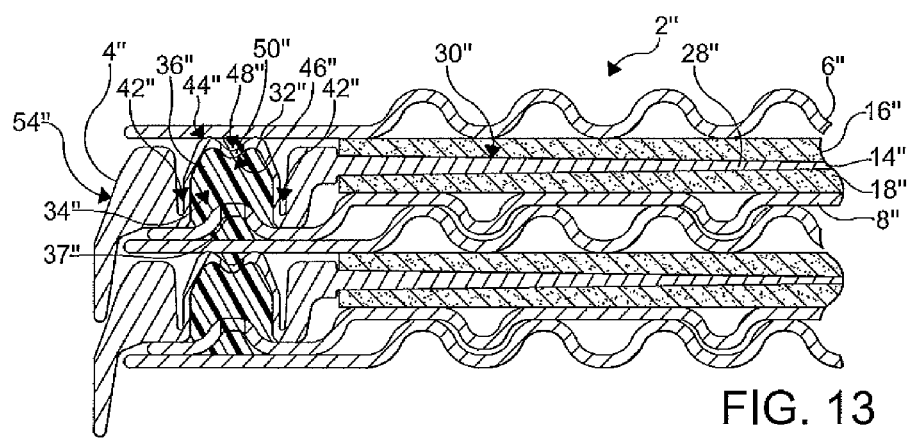
FIG. 13 is a fragmentary side cross-sectional elevational view of the fuel cell stack according to a further embodiment of the disclosure, taken at an edge section of the fuel cell stack shown by section line D-D in FIG. 1, shown with the plate present to illustrate assembly with the subgasket.
Figure 14:
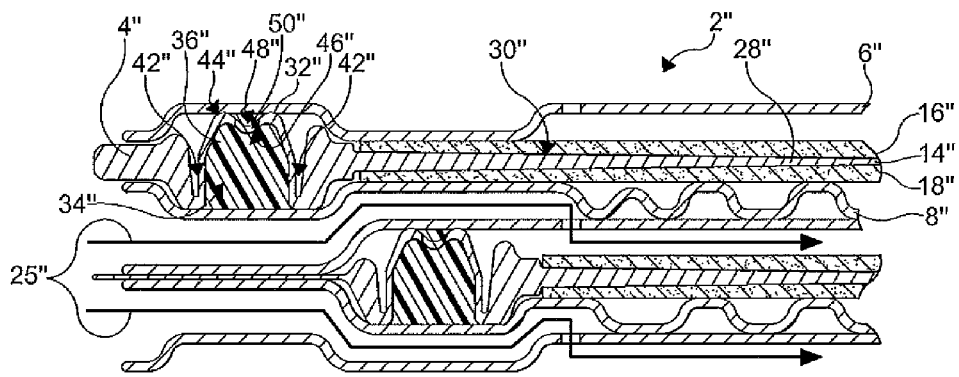
FIG. 14 is a fragmentary side cross-sectional elevational view of the fuel cell stack according to a further embodiment of the disclosure, taken at an anode feed section of the fuel cell stack shown by section line A-A in FIG. 1, shown with the plate present to illustrate assembly with the subgasket.

FIGS. 13-14 show the fuel cell stack 2" in accordance with a further embodiment of the invention. Similar structure discussed above for FIGS. 1-8 and FIGS. 9-12 includes the same reference numeral followed by a double-prime symbol (") for the purpose of clarity.

The fuel cell stack 2" may include a double bead approach with cooperating holes 37" in the plates 6", 8" and apertures 50" in the subgasket 4" in order to allow the sealant to extend from the plate 6" to the plate 8" during the method of manufacturing the bead seal 36". The membrane 28" is sufficiently thin for flexibility, but sufficient stiff to handle fill pressures during the manufacturing process. The tortuous form portion 32" of the membrane 28" is designed to spread under partial compression.

As shown in FIG. 13, edge features 54" may also be incorporated into the subgasket 4" in order to protect edges of the plates 6", 8". The edge features 54" may extend outwardly from the bead seal 36" and downwardly at an edge of one of the plates 6", 8". The edge features 54" may serve as external cell stack datum, and also facilitate cell stack retention through nesting or alternating interlocking configurations of the edge features 54".

The subgasket 4" may also be provided with internal alignment features (not shown) for aligning the MEA 14" and the diffusion medium layers 16", 18" to the subgasket 4". The internal alignment features may also be used for aligning the UEA including the MEA 14" and the diffusion medium layers 16", 18" to the plates 6", 8". Likewise, it should be appreciated that features for datum reinforcement and for affecting reactant flow such as honeycombed features for reducing bypass flows, may also be incorporated into the subgasket 4" using the method of the present disclosure.

With further reference to FIGS. 13 and 14, the inboard portion 30" of the membrane 28" may be tapered in order to minimize a tenting of the membrane 28" at an edge of the subgasket 4" that overlaps and abuts the MEA 14". For example, the tapered inboard portion 30" may overlap the proton exchange membrane of the MEA 14" about 6 mm. Skilled artisans may overlap the tapered inboard portion 30" to greater or lesser extents, as desired. The diffusion medium layers 16", 18" may likewise be tapered as shown, either prior to or during assembly with the MEA 14.

While certain representative embodiments and details have been shown for purposes of illustrating the invention, it will be apparent to those skilled in the art that various changes may be made without departing from the scope of the invention, which is further described in the following appended claims.

What is claimed is:

1. A method for manufacturing a subgasket for a fuel cell having a pair of plates disposed in a stack, the method comprising the steps of:
   positioning a membrane between the plates, the membrane including an inboard portion and a tortuous form portion defining at least one cavity between one of the plates and the membrane, the inboard portion abutting a proton exchange membrane of the fuel cell, and the tortuous form portion abutting each of the plates adjacent the at least one cavity; and
   injecting a sealant into the cavity; and
   curing the sealant to form a compliant bead seal on the membrane.

2. The method of claim 1, further comprising a step of partially compressing the stack prior to the step of injecting the sealant into the cavity.

3. The method of claim 2, wherein the partial compression is relieved following the step of injecting the sealant into the cavity to permit an expansion of the sealant within the cavity.

4. The method of claim 1, wherein the cavity is substantially filled with the sealant prior to the step of curing the sealant.

5. The method of claim 1, further comprising a step of fully compressing the stack following the step of curing the sealant to form the bead seal.

6. The method of claim 1, wherein the injection of the sealant into the cavity is performed through a sprue defined by the plates, the sprue in fluid communication with a port formed in each of the plates.

7. The method of claim 6, wherein the ports through which the sealant is injected into the sprue are datum holes for aligning the plates in the stack.

8. The method of claim 1, wherein the step of curing the sealant is performed at one of room temperature and an elevated temperature.

9. The method of claim 8, wherein the step of curing the sealant is performed at the elevated temperature, and the plates are heated prior to the injection of the sealant to cause the elevated temperature.

10. The method of claim 1, wherein a vacuum is drawn on the cavity to facilitate the injection of the sealant into the cavity.

11. The method of claim 1, wherein the tortuous form portion includes a pair of major troughs with a peak disposed therebetween, at least one of the major troughs abutting one of the plates and the peak abutting an other of the plates.

12. The method of claim 11, wherein the peak includes a minor trough defining another cavity.

13. The method of claim 12, wherein an aperture is formed in the minor trough of the tortuous form portion and the sealant when injected flows through the aperture and fills both cavities.

14. The method of claim 11, wherein the peak is affixed to the other of the plates with an adhesive.

15. The method of claim 1, wherein the membrane is formed from one of polypropylene, PEN, and PET.

16. The method of claim 1, wherein the membrane is formed from a polymeric foam.

17. The method of claim 1, wherein the sealant is one of a two-part curable elastomer and a thermally curable elastomer.

18. The method of claim 1, wherein the sealant is a foaming elastomeric fluid.

19. A subgasket for a fuel cell stack having a pair of plates, comprising:
   a membrane positioned between the plates, the membrane including an inboard portion and a tortuous form portion, the inboard portion abutting a proton exchange membrane of the fuel cell, and the tortuous form portion including a pair of major troughs with a peak disposed therebetween defining at least one cavity between one of the plates and the membrane, at least one of the major troughs abutting one of the plates and the peak abutting an other of the plates, and
   a compliant bead seal formed on the membrane by injecting a viscous sealant into the at least one cavity and curing the sealant.

20. A fuel cell stack, comprising:
   a pair of plates disposed in a stack;
   a pair of diffusion medium layers disposed between the plates;
   a membrane electrode assembly sandwiched between the diffusion medium layers; and
   a subgasket including a membrane positioned between the plates, the membrane including an inboard portion and a tortuous form portion, the inboard portion abutting a membrane electrode assembly of the fuel cell, and the tortuous form portion defining at least one cavity between one of the plates and the membrane and abutting each of the plates adjacent the at least one cavity, a compliant bead seal formed on the membrane by injecting a viscous sealant into the cavity and curing the sealant.

* * * * *